United States Patent [19]
Webber, Richard L. et al.

[11] Patent Number: 4,769,756
[45] Date of Patent: Sep. 6, 1988

[54] SYSTEMATIC METHOD FOR MATCHING EXISTING RADIOGRAPHIC PROJECTIONS WITH RADIOGRAPHS TO BE PRODUCED FROM A SPECIFIED REGION OF INTEREST IN CANCELLOUS BONE

[75] Inventors: Webber, Richard L., Myersville; Ruttimann, Urs E., Kensington, both of Md.; Van Der Stelt, Paul F., Ha Amstelveen, Netherlands; Paul Edholm, Linköping, Sweden

[73] Assignee: The United States of America as represented by the Department of Health and Human Services, Washington, D.C.

[21] Appl. No.: 894,251

[22] Filed: Aug. 7, 1986

[51] Int. Cl.⁴ ............................................. G06F 15/42
[52] U.S. Cl. ................................................ 364/413.16
[58] Field of Search ...................... 364/414; 378/98, 23, 378/191; 358/111

[56] References Cited

U.S. PATENT DOCUMENTS 4,247,780 1/1981 Webber et al. .................... 378/99

Primary Examiner—Jerry Smith
Assistant Examiner—Clark A. Jablon
Attorney, Agent, or Firm—Browdy & Neimark

[57] ABSTRACT

A method to synthesize arbitrary projection images from a basis set of projections bearing a known geometric relationship to each other. In order to determine retrospectively the projection angle of a radiograph of interest with repect to the set of basis projections, similarity measures based on the gray-level standard deviations in corresponding images are used. An iterative coordinate estimation procedure is implemented incorporating these methods with radiographs obtained from dry skull specimens.

18 Claims, 4 Drawing Sheets

SYSTEMATIC METHOD FOR MATCHING EXISTING RADIOGRAPHIC PROJECTIONS WITH RADIOGRAPHS TO BE PRODUCED FROM A SPECIFIED REGION OF INTEREST IN CANCELLOUS BONE

BACKGROUND OF THE INVENTION

The present invention deals with a method of reconstructing a projection of an object produced from an unknown position in space from a series of projections bearing a known geometric relationship to each other and more particularly it deals with the use of gray-level standard deviations in corresponding subtraction images as similarity measures in order to determine retrospectively the projection angle of a radiograph of interest with respect to the set of basis projections with an iterative coordinate estimation procedure incorporating this technique.

The performance of subtraction radiography is critically dependent on the ability to produce two radiographic images that have close to identical projection geometries. The requirement of identical projections can be satisfied by using a bite-block permitting mechanically rigid and reproducible connections between x-ray source, patient, and film at successive exposures. However, this method is inconvenient for both the patient and the operator, because it requires customized fabrication for each patient and thus is costly and time consuming, and it precludes using radiographs other than those made with that particular bite-block. As a result, the use of subtraction radiography has been restricted to small groups of patients in research applications.

An alternative solution has been proposed by R. L. Webber, U. E. Ruttimann, R. A. J. Groenhuis, and P. Edholm in an article entitled "Synthesis of Arbitrary X-Ray Projections from a Finite Number of Existing Projections" published in *SPIE* Vol. 535, pp. 84–91, 1985. By using tomosynthesis as discussed by R. A. J. Groenhuis, R. L. Webber, and U. E. Ruttimann in their article entitled "Computerized Tomosynthesis of Dental Tissues" published in *Oral Surg., Oral Med., Oral Path.*, Vol. 56, pp. 206-214, 1983, they have reconstructed a desired arbitrary radiographic projection from multiple projections bearing a known geometric relationship to each other. This method could be used to synthesize the proper projection required for accurate substraction without the need for physically coupling x-ray source, patient, and film.

Assuming then that a basis set of images suitable for tomosynthesis is available, what is required is the location of the x-ray source position that was used to make a particular radiographic projection of interest relative to this basis set.

SUMMARY OF THE INVENTION

It is an object of the present invention to perform the method described in a short time period allowing for low exposure to radiation, and comfort to the patient with performance to obtain the results before the patient has a chance to move and spoil the taking of the radiographs.

It allows use of a hand-held source allowing different positioning within limits of the source and comparison of radiographs taken at different times.

It is a further object of the invention to allow comparison of data taken at the present time with data obtained previously, i.e. for purposes of identification, or to compare with references to calculate relative sizes in three dimensions.

The present invention involves the use of a measure of image similarity to determine retrospectively the unknown projection angle of a radiograph of interest with respect to a set of eight component images as used for tomosynthesis.

By the present invention the location of an x-ray source to make a particular radiographic projection is determined retrospectively.

In the present invention, gray-level standard deviations in corresponding substraction images are used as similarity measures in order to determine retrospectively the projection angle of a radiograph of interest with respect to a set of basis projections.

Also the present invention defines a method of reconstructing a projection of an object produced from an unknown position in space from a series of projections bearing a known geometric relationship to each other comprising the steps of making a set of basis projections characterized by gray-level distributions, said basis projections bearing known geometric relationship with each other such that the positions of the sources used to produce the basis projections circumscribe the position of the source from which the unknown projection was made;

comparing each known basis projection with the projection to be reconstructed using an appropriate measure of image similarity;

establishing respective estimates of the angles characterizing the unknown projection relative to each of the known basis projections;

using these estimates of unknown projection angles, to weight and geometrically shift the known basis projections and average them to synthesize an approximation of the desired projection.

DETAILED DESCRIPTION OF A PREFERRED EMBODIMENT

In order to describe the present invention the technique was evaluated using radiographs obtained from dry skull specimens and therefore the preferred embodiment will be described in this manner but should not be limited in respect to its uses in this manner.

Figures 1, 2:
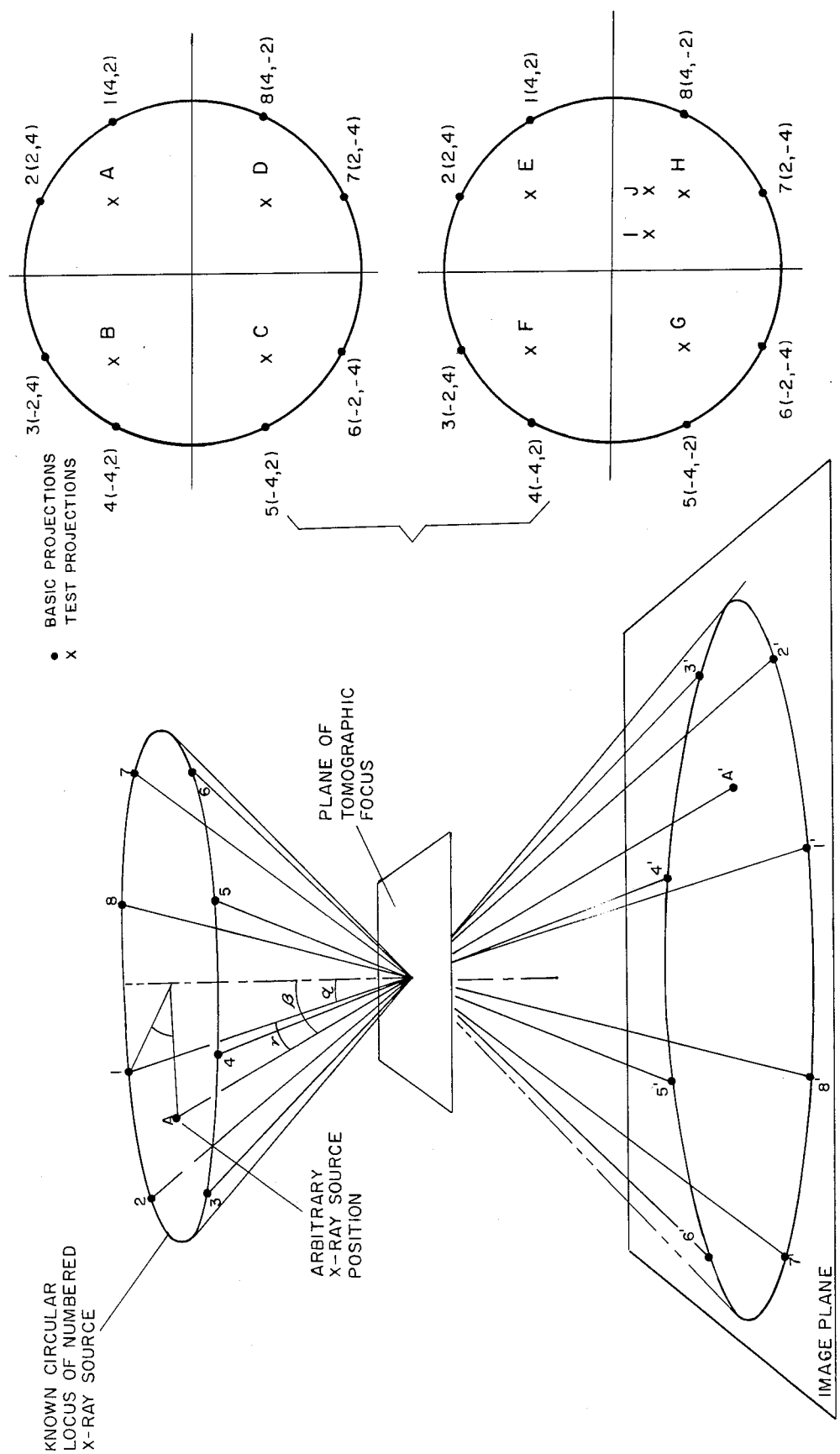
FIG. 1 illustrates the projection geometry used in the process of tomosynthesis.
FIG. 2 shows diagrammatically the relative location of source positions to produce the basis and the test projection sets.

As shown in FIG. 1, sets of eight conventional dental radiographs of the premolar/molar region of two dry human mandibles were produced satisfying the imaging geometry required for tomosynthesis. In FIG. 1 there is shown only the projection geometry used for the tomosynthesis technique. The source positions 1 to 8 at an angular disparity=4° produces the basis projection set. The source position for an arbitrary test projection A is also shown.

The x-ray focal spot positions are located on a circle spanning a projection cone with the apex at the anatomical site of interest. With the opening half angle of the cone=4.5°, two adjacent projections have an angular discrepancy of about 2.8°. In the present example the focal-object distance was 30 cm. and the object-film distance was 2 cm. resulting in life-sized images. This set of radiographs is referred to as the basis projections.

Four and six additional radiographs, referred to as test projections, were produced from the respective mandibles under the same conditions, except the source positions were located in arbitrarily selected, known locations off the basis projection circle, as shown in FIG. 2.

All radiographs were converted into 512×512×8 bit, digital images by a video camera and analog to digital converter interfaced with an image processing system such as a DeAnza IP-6400. Prior to digitalization, all images within a set from one mandible were registered manually with respect to a clearly noticeable anatomical landmark, in this case the mesial-buccal pulp horn of the first molar.

Furthermore, for the purposes of evaluating the suitability of various measures of image similarity, a series of radiographs were obtained with increasing angular disparity in directions perpendicular to the long axes of the teeth (x-direction) and parallel to the tooth axes (y-direction). These images were registered in two different ways as follows: (1) with respect to a fixed set of metal wires overlaying the film in direct contact, and (2) relative to an anatomical landmark within the object itself, described above.

Under the assumption that no change of structures in the object itself occurred and film contrast differences are negligible, the discrepancy between two different radiographic projections are due to perspective transformations and image noise. While the transformation parameters involved could either be exactly or iteratively solved under various simplifying assumptions (quasi two-dimensional senses or objects formed by rectangular parallelepipeds), these assumptions cannot be justified reasonably for the radiographic projections in this application, and thus a different approach was pursued. The simplifying assumptions that hold in the present context are a constant, large focal-object distance and a constant, small object-film distance, no rotation of the image plane, and small differences of the projection angle. Then the ensuing image differences other than the image noise component may be considered the result of depth (z-axis) dependent xy-shifts of coplanar object layers due to different angles of view, causing different relative shifts and overlays of anatomical structures. If the effect of lateral shifts can be referenced properly by registration of the images relative to a landmark at a fixed depth, then image similarity measures should be strongly correlated with projection angle.

An earlier study with dental radiographs has shown that such a measure, the gray-level standard deviation SD in the subtraction image of pairs of radiographs was linearly related to angular discrepancy over a wide range. Other image similarity measures investigated in the present study were the normalized mean absolute difference NMAD, cross-entropy CE, and deterministic sign change DSC. In order to exclude border artifacts, these measures were computed over a central region R of the respective image pairs with pixel gray levels $f(i,j)$ and $g(i,j)$:

$$SD = (\Sigma(f(i,j) - g(i,j))^2 - (F-G)^2/\#R)^{\frac{1}{2}}(\#R - 1)^{-\frac{1}{2}} \quad (1)$$

$$NMAD = \Sigma |f(i,j) - g(i,j)|/(F+G) \quad (2)$$

$$CE = (1/F)\Sigma f(i,j) \cdot \ln(f(i,j)/g(i,j)) - \ln(F/G) \quad (3)$$

$$DSC = \#\text{sign}(f(i,j) - g(i,j) + (-1)^{i+j}q)/(\#R - 1), \, i,j \in R \quad (4)$$

where $$X\Sigma = \Sigma\Sigma i, j \in R$$

$F = \Sigma f(i,j)$, $G = \Sigma g(i,j)$
$\#R$ = number of pixels in R
$\#\text{sign}(\,)$ = number of sign changes in ( )
$q$ = constant.

Equation (4) means that a "checkerboard" image $-q, +q, -q, +q \ldots$ (with $q=2$) is added to the subtraction image, and the number of resulting sign changes within the $\#R$ pixels are normalized with the expected number of $\#R - 1$ sign changes.

Figure 3:
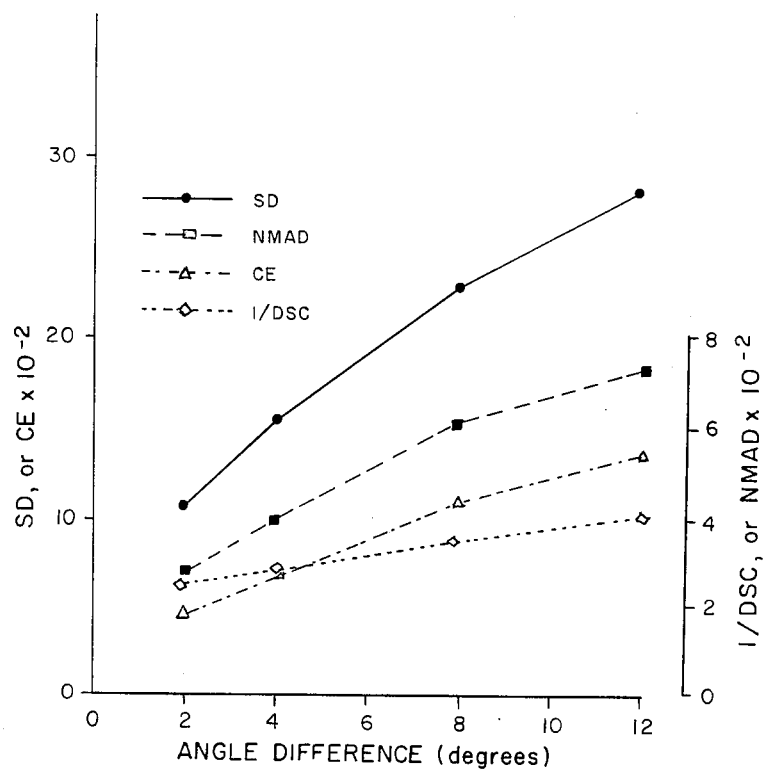
FIG. 3 is a graph showing similarity measures for angular discrepancies when images were registered with respect to metal wires.
Figure 4:
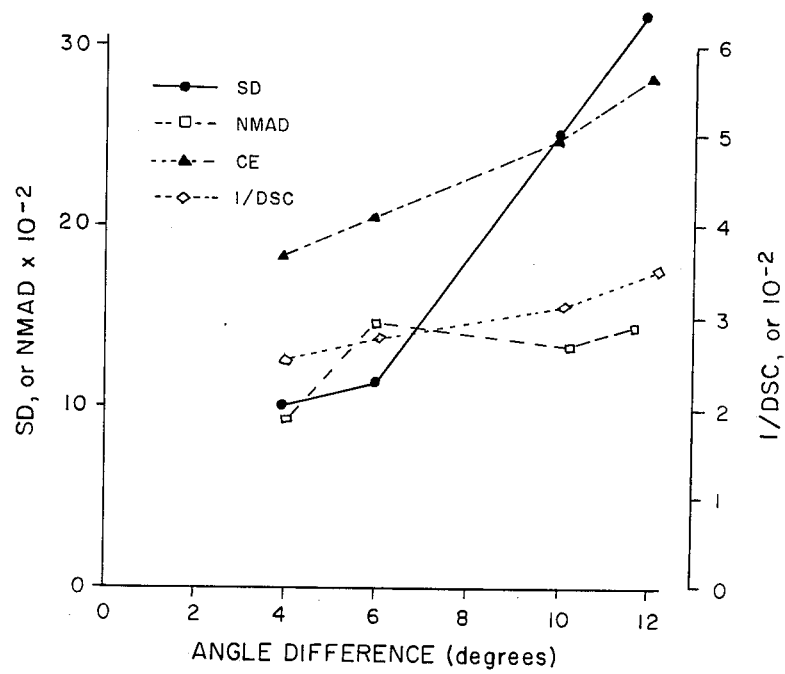
FIG. 4 is a graph showing similarity measures for angular discrepancies when images were registered with respect to an anatomical landmark.

FIG. 3 displays observed similarity measures for images that were registered with respect to metal wires in contact with the film. The results shown in FIG. 4 were obtained from images that were registered with respect to an anatomical landmark within the object itself. While the behavior of the various measures under registration conditions for FIG. 3 are not very different, the gray-level standard deviation SD appears to display a somewhat steeper slope than the other measures for the conditions of FIG. 4. Although the registration conditions leading to FIG. 3 are more rigidly defined than those associated with FIG. 4, the latter are less limiting for practical applications, and permit the comparison of archived radiographs taken at some earlier time with the basis projection set, as would be required in forensic applications (as later discussed). For this reason, the registration procedure using object generic landmarks was given preference. Therefore, the usefulness of the gray-level standard deviation SD was further pursued in his application because of its superior relative performance shown in FIG. 4, and its simple computation and general accessibility (some commercially available image processing systems provide special hardware for histogram computations).

Image similarity is necessarily dependent on the particular structures present in respective images to be compared, for it is the very presence of structures that permits differentiation of images, and all structureless (i.e. constant gray level) images are equivalent in that sense. Hence, the actual value of the gray-level standard deviation SD for a given angulation difference varies across images, and it also varies with the direction of the angular discrepancy relative to the generally anisotropic object structures. Clearly, images of objects with one-dimensional, parallel structures, say in the x-direction, cannot reveal angular discrepancies in the x-direction.

Figure 5:
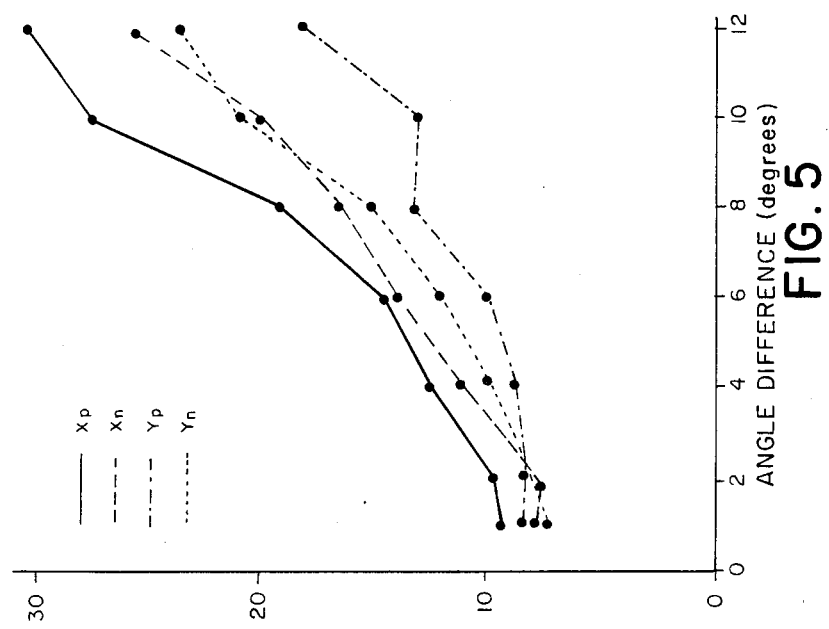
FIG. 5 is a graph showing the anisotropy of gray-level standard deviation SD with respect to direction of misangulation.

FIG. 5 illustrates the anisotropy of the gray-level standard deviation SD measured from images of one mandible registered with respect to an internal landmark. The projection angle was changed in the positive and negative x-direction ($x_p$ and $x_n$), and similarly for the y-direction ($y_p$ and $y_n$). The gray-level standard deviation SD for a given angle was slightly larger in the x- than in the y-direction because the long axes of the teeth were aligned in the y-direction. It is also noted that the curves cannot expect to go through the origin, due to statistical image noise present. Therefore, angle estimation procedures based on the gray-level standard deviation SD have to account for a positive, but generally unknown y-axis intercept.

Figure 6:
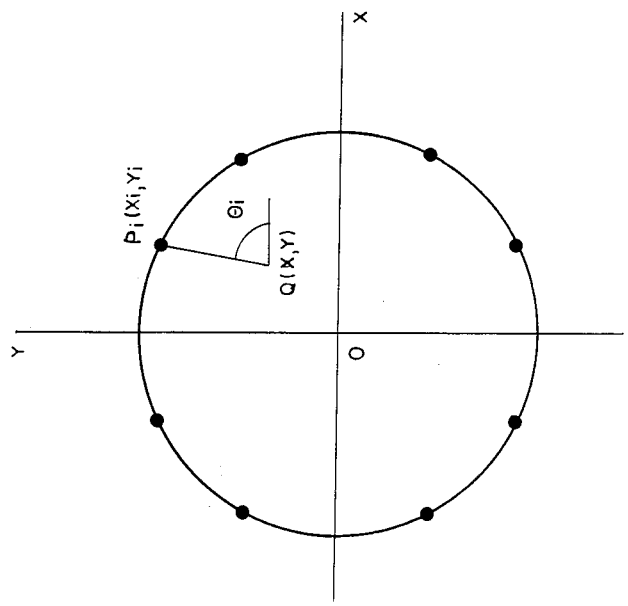
FIG. 6 diagrammatically shows the spatial relation of test projection Q relative to the basis projections $P_i$.

Based on the results of the above, first a least square linear regression fit to the empirical relation of gray-level standard deviation SD versus angulation difference for each particular anatomical site of interest was estimated. For that purpose the eight basis projections (FIG. 2) with known relative angular discrepancies were used, providing four image pairs with 4°, four pairs with 8°, and eight pairs with about 9°. The resulting y-axis intercept parameters, a, were noted. Next, the similarity of a test projection Q relative to each basis projection $P_i$ was assessed, providing a set of standard deviations $SD_{QPi}$, $i=1,2 \ldots 8$ shown in FIG. 6.

A first approximation to the unknown coordinates x, y of Q (in degrees) relative to the origin O was obtained from the linear first moments $$x^o = \sum_{i=1}^{8} x_i u_i / \sum_{i=1}^{8} u_i \quad (5)$$

$$y^o = \sum_{i=1}^{8} y_i u_i / \sum_{i=1}^{8} u_i \quad (6)$$

where $$u_i = 1/(SD_{QPi} - a) \quad (7)$$

In accordance with the assumed regression model of a linear relation of gray-level standard deviation SD versus angulation difference, the "weights" $u_i$ are inversely proportional to the standard deviations adjusted by the y-axis intercept, a.

This first approximation was then iteratively improved by using at each step k the estimates of the directions $\theta_i^{k-1}$ between Q and $P_i$ obtained at step $k-1$ (FIG. 6), permitting an orthogonal decomposition of gray-level standard deviation SD values. Hence, for $k=1,2,\ldots$ $$x^k = \sum_{i=1}^{8} x_i v_i^{k-1} / \sum_{i=1}^{8} v_i^{k-1} \quad (8)$$

$$y^k = \sum_{i=1}^{8} y_i w_i^{k-1} / \sum_{i=1}^{8} w_i^{k-1} \quad (9)$$

$$v_i^{k-1} = 1/(SD_{QPi}-a)|\cos(\theta_i^{k-1})| \quad (10)$$

$$w_i^{k-1} = 1/(SD_{QPi}-a)|\sin(\theta_i^{k-1})| \quad (11)$$

The iterations were terminated when successive improvements of $x^k$ and $y^k$ were below a given small constant.

The results of this relative angle estimation procedure applied to the test projections indicated in FIG. 2 are shown in Table 1.

TABLE 1

Results of Angle Determination

| Location | actual coordinates* | | estimated coordinates* | | error** |
|---|---|---|---|---|---|
| | x | y | x | y | |
| | | mandible 1 | | | |
| A | 2 | 2 | 2.0 | 2.0 | 0. |
| B | −2 | 2 | −2.0 | 1.97 | 0.030 |
| C | −2 | −2 | −2.0 | −1.60 | 0.399 |
| D | 2 | −2 | 1.91 | −1.02 | 0.982 |
| | | | average | | 0.353 |
| | | mandible 2 | | | |
| E | 2 | 2 | 1.13 | 1.94 | 0.871 |
| F | −2 | 2 | −1.60 | 1.76 | 0.464 |
| G | −2 | −2 | −1.88 | −0.72 | 1.289 |
| H | 2 | −2 | 1.99 | −1.64 | 0.355 |
| I | 1 | −1 | 0.38 | −0.77 | 0.665 |
| J | 2 | −1 | 1.95 | −0.94 | 0.075 |
| | | | average | | 0.620 |
| Total average ± SD | | | | | 0.513 ± 0.435 |

*in degrees with respect to center of basis projections
**root of sum of squared errors in x- and y-directions The coordinates are expressed in degrees of angulation relative to the center of the circular set of basis projections. The estimation error ranged from 0° to 1.289°, with a mean ±SD of (0.513±0.435)°, which is small compared to the angular discrepancy of nearest neighbors in the basis projection set of about 2.8°. The median number of iterations per test location required was 13.

The method of the present invention estimates retrospectively the projection angle of a radiograph with respect to a set of images with known projection angles. The method is based on using the standard deviation of the gray levels in the subtraction image of corresponding image pairs as a measure of similarity. Although this measure is not a strictly linear function of projection angle discrepancy, and it displays structure-related anisotropy, a linear model tailored to each anatomic site determined by regression analysis, and assuming isotropy provides sufficient accuracy for clinical use. However, it is unlikely that the accuracy of the estimation procedure can be improved further than used in this simple method. Nonmonotonic changes of the gray-level standard deviation level SD as a function of angulation discrepancy, related to nonpredictable changes of projected shape and overlay of anatomic details at different angles are limitations to the present approach. In particular, the linear extrapolation of the gray level standard deviation level SD to angle discrepancies below 0.5° is suspect because there the structure-related gray-level changes become in magnitude similar to the largely isotropic image noise. Obviously, the gray-level standard deviation level SD cannot separate these two components. Despite these limitations, the estimation errors in the order of 0.5° are small enough for clinical applications. Previous studies indicated that angulation errors of up to 2° or 3° may still provide clinically useful subtraction images.

The assumption requiring the test projection to have its x-ray source location inside the circle defined by the basis projections may seem to be a severe restriction. However, clinical studies have shown that the variation in aiming the x-ray beam to a particular site of interest as performed by dentists is in most cases within 8°. This variation is comparable to the full opening angle of 9° of the cone spanned by the projection directions of the basis images, and hence it is highly likely that any given, clinically meaningful radiograph satisfies the required constraints.

One application of the method described, which motivated its development, is to synthesize proper projections required for serial subtraction radiography using the basis projection set. The basis projections will be obtained by a newly designed dental x-ray system currently under development consisting of an electronically controlled, multiple focal spot x-ray source, integrated with a detector based on digital fluoroscopy such as found discussed in the article of R. A. J. Groenhuis, U. E. Ruttimann, and R. L. Webber, "A Prototype Digital Tomographic X-Ray System for Dental Applications", *IEEE Int. Symp. on Medical Images and Icons,* pp. 218–221, 1984. In this use, the series of subtraction radiographs will permit the longitudinal monitoring of bone changes due to periodontal disease.

Another application is in forensic dentistry, where the identity of a body is required to be established using archived dental records. Basis projection sets can be produced from available dentition fragments registered to the x-ray machine, and the similarity and eventually the relative projection angles under which the archived radiographs were obtained can be determined. The trabecular patterns in the bones supporting the teeth tend to be unique for each individual and do not change significantly over time. Thus, the subtraction of proper radiographic projections from archived radiographs provides a highly selective method for unequivocal identification.

The gray-level standard deviation in the subtraction image of a pair of different radiographic projections is a useful and computable similarity measure. Based on this measure the projection direction of a given radiograph of interest relative to a set of basis images with known projection angles can be determined retrospectively. The accuracy of the method is sufficient to produce clinically meaningful subtraction images.

The method of the present invention which involves a systematic method for matching existing radiographic projections with radiographs to be produced from a specified region of interest in cancellous bone is performed as follows:

(1) Make eight radiographs of the region of interest which must contain at least some undisturbed cancellous (trabecular) bone. These radiographs must be produced using a known projection-geometry pattern. One of the most convenient patterns involves positioning the central ray on the surface of a right circular cone having its apex located at the center of the region of interest positioning the plane of the image detector (film, for example) perpendicular to the axis of the cone, and distributing the eight projections of the central ray uniformly on the surface of the cone such that they always pass through its apex. The focal/object and object/detector distances must be representative of the projection geometry used in the exposure of the radiographs to be matched.

(2) Using a suitable digital, image recording system such as a television camera coupled to an electronic frame buffer through an analog to digital converter, digitize all eight radiographic projections produced in step (1) above. The geometric relationships underlying their production must be preserved in this process. This is conveniently accomplished by strict registration of all projections relative to known points of fiducial reference prior to digitization.

(3) Delimit a representative area within the region of interest with an identifiable boundary which is homologously positioned within each projection using tomosynthetic methods to assure that the same tissue is contained in all eight projections.

(4) Position all previously existing (candidate) radiographs such that when they are digitized, the regions to be matched appear to be oriented anatomically in the same way as in the radiographs produced in step (1). They also should lie inside the bounded region delimited in step (3) when the digitization is accomplished.

(5) Use a robust method to correct for any significant variations in contrast between all digitized candidates and the projections digitized from step (1). The process must be constrained such that only the area inside the fixed-shape boundary is considered in each and every case. A reasonable algorithm for doing this is described by U. E. Ruttimann, R. L. Webber, and E. Schmidt in a paper entitled, "A Robust Digital Method for Film Contrast Correction in Subtraction Radiography" which has been accepted for publication in the Journal of Peridontal Research.

(6) Digitally subtract all eight projections from each contrast-corrected candidate image, compute histograms of the digital values corresponding to the respective pixel gray-levels in each subtracted image, and then compute a suitable measure of image similarity based on the first-order statistics so obtained. Our research suggests that the standard deviation of each respective image-difference histogram is a particularly robust statistic for this purpose.

(7) For each candidate select the projection/candidate subtraction image which yields the greatest measure of similarity (smallest standard deviation of the associated histogram). Retain the associated parent images for further processing.

(8) Reregister all the paired digital images selected in step (7) by selectively moving the candidate image relative to the associated image projection such that when the two images are displayed simultaneously, one as a positive and the other as a negative, they cancel maximally in the region delimited by the boundary described in step (3). The inventors have developed an algorithm, based on maximization of the cross correlation inside the bounded region common to both images, to automate this process.

(9) Again, express the respective results as rankable measure of image similarity based on the histogram produced by subtracting the image pairs after reregistration as described in step (8).

(10) The candidate associated with the difference image exhibiting the greatest image similarity (smallest standard deviation), is most likely to match the selected region described in step (1) if indeed such a match exists.

(11) Alternatively, this can be verified by using the method described in our paper entitled, "Synthesis of Arbitrary X-ray Projections from a Finite Number of Existing Projections" which was published in SPIE, Vol. 535, Application of Optical Instrumentation in Medicine XIII, February, 1985, pp. 84–91. Therein is used the image similarity measures for all eight projections produced in step (6) after reregistration as described in steps (7) and (8). This results in an estimate of the projection angle used to produce the matched candidate image which has been shown to be more accurate statistically than the nearest neighbor approximation produced by step (10). This method is accomplished by relating an arbitrary x-ray projection to several projections of the same object produced from a small array of source positions bearing a known circular geometric relationship to each other. From this it is possible to synthesize approximately an arbitrary projection not contained in the known data set.

(12) Use the estimate of projection angle computed in step (10) or step (11) to reposition the x-ray source which now likely will no longer lie on the surface of the original cone described in step (1). Reexpose the region of interest using this new projection geometry and iterate the process of geometric registration, digitization, contrast correction, image subtraction, described in steps (2) through (10) until it becomes obvious that either the process converges (image similarity becomes so great that only uncorrelated quantum mottle is responsible for the observed differences), or it does not converge, (significant differences persist in spite of the iterative process). In the first instance the result indicates an unequivocal match whereas the second result demonstrates that no match is possible implying that none of the candidates selected were produced from the original region of interest described in step (1).

With the use of the above method the use of subtraction radiography in dentistry and forensic medicine among other uses is made both possible and practical.

The foregoing description of the specific embodiment(s) will so fully reveal the general nature of the invention that others can, by applying current knowledge, readily modify and/or adapt for various applications such specific embodiment(s) without departing from the generic concept, and, therefore, such adaptations and modification should and are intended to be comprehended within the meaning and range of equivalents of the disclosed embodiment(s). It is to be understood that the phraseology or terminology employed herein is for the purpose of description and not of limitation.

It will also be understood that apparatus for carrying out the present invention is currently available, and that the selection of appropriate equipment to carry out such process will be well within the capabilities of those having normal skill in the art.

What is claimed is:

1. A method of reconstructing a projection of an object produced from an unknown position in space from a series of projections bearing a known geometric relationship to each other comprising the steps of making a set of basis projections characterized by gray-level distributions, said basis projections bearing known geometric relationship with each other such that the positions of the sources used to produce the basis projections circumscribe the position of the source from which the unknown projection was made;

comparing each known basis projection with the projection to be reconstructed using an appropriate measure of image similarity;

establishing respective estimates of the angles characterizing the unknown projection relative to each of the known basis projection angles;

using these estimates of unknown projection angles, to weight and geometrically shift the known basis projections and average them to synthesize an approximation of the desired projection.

2. The method of claim 1 further comprising the steps of using an iteration scheme to achieve successively better estimates of the relative projection angles of the unknown projection relative to each of the known basis projection angles.

3. The method of claim 1 further characterized by the sources of the said basis projections being distributed on the circumference of the base of a right circular cone with its apex in the object from which the projections are created.

4. The method of claim 1 further characterized by using parameters derived from an analysis of the statistics underlying the gray-level distributions produced from the basis projections when compared with the unknown projection to determine the relative projection angles defined by lines connecting said sources associated with the basis set and the center of the object, and the line connecting the source associated with the unknown projection and the center of the object.

5. The method of claim 4 further characterized by said statistics including anisotropic measures of angular disparity to produce image similarity measures having different values in different directions.

6. The method of claim 4 further characterized by establishing a functional relationship between said similarity measure and the angular relationship between the known projection angles underlying the basis projection set.

7. The method of claim 6 further characterized by using said functional relationship to estimate the said positions in space of the source used to produce the unknown projection in an iterative manner.

8. The method of claim 1 further characterized by using the principle of back projection to reconstruct a three-dimensional representation of the object to facilitate synthesis of said desired projection.

9. The method of claim 8 further characterized by using circular tomosynthetic methods and spatial-frequency filtering techniques to produce a three dimensional representation of the object through a plurality of individual slices which are stacked in a skewed manner and averaged in a direction orthogonal to the plane of the said slices to yield an approximation to the unknown projection.

10. The method of claim 9 further characterized by using selective weighting of individual basis projections consistent with the proximity of the associated source positions relative to that of the unknown projection prior to tomosynthetic reconstruction.

11. The method of claim 10 further characterized by using selected weights inversely proportional to the distance of said source positions of the basis set from the source position of the unknown projection.

12. A method of selecting a single projection from a first series of projections bearing a known geometric relationship to each other which lies within a predetermined minimum distance from another single projection from an independent second series of projections bearing the same geometric relationship to each other comprising the steps of positioning the sources of said projections on the circumference of the base of a right circular cone with its apex in the object from which the projections are created;

equally distributing the source positions on the circumference of the base of said cone such that the distance between adjacent source positions is not more than twice the said predetermined minimum distance;

constraining the said circular distributions to overlap;

and selecting the two projections from both distributions that are closest together.

13. The method of claim 12 further characterized by using gray level distributions in the projections to measure image similarity.

14. The method of claim 12 further characterized by shifting one projection with respect to the other until image similarity is maximized and recording absolute shift distance.

15. The method of claim 14 further characterized by choosing an arbitrary projection from said first series.

16. The method of claim 15 further characterized by using image similarity to select a projection from said second series nearest the selected projection from said first series.

17. The method of claim 16 further characterized by using image similarity to select a projection from said first series nearest the projection selected from said second series in said previous step of selecting a projection from said second series nearest the selected projection from said first series.

18. The method of claim 17 further characterized by iterating said steps of selecting a projection from said second and said first series until the selections of the projections converge to a repeating pattern.

* * * * *